United States Patent [19]

Akiyama et al.

[11] Patent Number: 4,629,886
[45] Date of Patent: Dec. 16, 1986

[54] HIGH RESOLUTION DIGITAL DIFFRACTION GRATING SCALE ENCODER

[75] Inventors: Koji Akiyama; Hideto Iwaoka, both of Tokyo, Japan

[73] Assignee: Yokogawa Hokushin Electric Corporation, Tokyo, Japan

[21] Appl. No.: 591,511

[22] Filed: Mar. 20, 1984

[30] Foreign Application Priority Data

Mar. 23, 1983 [JP] Japan ................................ 58-48187
Jul. 21, 1983 [JP] Japan ............................... 58-133138

[51] Int. Cl.$^4$ ................................................ H01J 3/14
[52] U.S. Cl. .......................... 250/237 G; 250/231 SE
[58] Field of Search ........ 250/231 R, 231 SE, 237 G; 356/395, 354–357; 340/347 P

[56] References Cited

U.S. PATENT DOCUMENTS

| | | | |
|---|---|---|---|
| 3,756,723 | 9/1973 | Hock | 250/237 G |
| 3,796,498 | 3/1974 | Post | 250/237 G |
| 3,891,321 | 6/1975 | Hock | 356/356 |
| 3,904,295 | 9/1975 | Hock et al. | 356/354 |
| 4,334,779 | 6/1982 | Domey et al. | 356/358 |
| 4,358,201 | 11/1982 | Makosch | 356/357 |

Primary Examiner—David C. Nelms
Attorney, Agent, or Firm—Moonray Kojima

[57] ABSTRACT

An optical scale reader comprises a light source for radiating a beam of coherent light on a reflective scale, a half mirror for mixing light beams from the light source which are reflected and diffracted by the scale for interference with each other, an optical system for causing the interfering light beams leaving the half mirror on its opposite sides to be 90° out of phase with each other so that the light beams will fall on the half mirror at a particular angle of incidence, photodetectors for detecting the interfering light beams, respectively, which have left the half mirror, and a signal processor for processing first and second electric signals which are supplied from the photodetectors and 90° out of phase with each other to generate a signal indicative of the distance which the scale has moved. There is also disclosed a position control device incorporating the optical scale reader.

9 Claims, 11 Drawing Figures

HIGH RESOLUTION DIGITAL DIFFRACTION GRATING SCALE ENCODER

BACKGROUND OF THE INVENTION

1. Field of Invention

This invention relates to a high resolution optical scale reader for measuring a distance of movement of a reflective scale by utilizing interference of diffracted beams of coherent light and measuring a direction of movement of the scale by utilizing a phase delay of the beams caused on reflection on a half mirror, and more particularly, to such an optical scale reader which, for example, can be used effectively as a position detector for positional detection in the range of submicrons, in a VLSI manufacturing apparatus, electron beam exposure apparatus, and the like.

2. Description of the Prior Art

Figure 1:
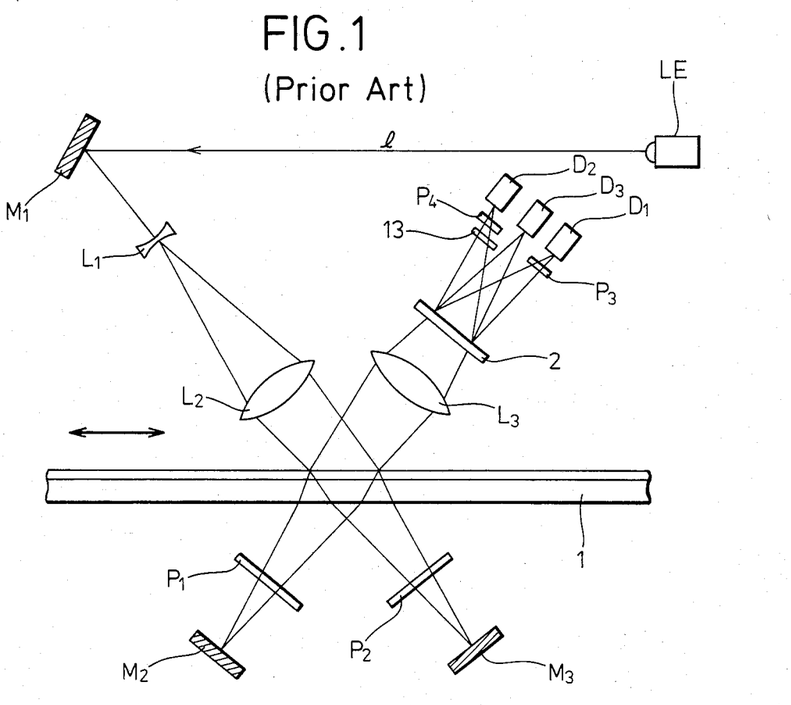
FIG. 1 is a schematic view depicting a conventional optical scale reader.

Known in the art are a variety of optical scale readers using the principle of interference of light. FIG. 1 illustrates a conventional optical scale reader. A laser beam 1 emitted by a laser beam source LE is reflected by a mirror M1, and travels through lenses L1,L2 onto a scale 1. A +1st order diffracted beam of light which is diffracted by scale 1 hits a mirror M2, and a 0th order diffracted beam of light hits mirror M3. The +1st order diffracted beam of light reflected by mirror M2 is then radiated onto a lense L3. The 0th order diffracted beam of light reflected by mirror M3 is diffracted by scale 1 and falls as a −1st order diffracted beam of light on lense L3.

At this time, the +1st order and −1st order diffracted beams of light are converted by respective polarizers P1, P2, into linearly polarized beams of light having planes of polarization which are angularly displaced 90° from each other. The beam of light combined by lens L3 is divided by a beam splitter 2 into three beams which are directed to photoelectric transducers D1,D2 and D3, respectively. Photoelectric transducer D3 generates an output signal which is employed for automatic gain control to keep laser beam 1 constant. The light beams falling on photoelectric transducers D1, D2 are 90° out of phase with each other because of a ¼ wave plate 13 preceding the photoelectric transducer D2. The +1st order diffracted beams of light are mixed by analyzers P3,P4 preceding the transducers D1,D2 and having planes of polarization which are angularly displaced 45° from each other. The beams of light, with interference fringes, are converted into electric signals by transducers D1,D2. The output signals from transducers D1,D2 are then processed into a value indicative of a distance which scale 1 has moved.

The scale of the foregoing optical reader arrangement is light transmissive and cannot be easily moved. The prior optical reader has been complex in construction, requiring polarizers, analyzers, ¼ wave plates, and beam splitters for bringing the light beam 90° out of phase.

SUMMARY OF THE INVENTION

Accordingly, an object of the invention is to overcome the aforementioned and other disadvantages and deficiencies of the prior art.

Another object is to provide a high resolution optical scale reader which is of simple construction and is easy to control, and which employs a reflective scale, a light beam, which is directed against the scale, being of a large diameter, for minimizing adverse influence of dirt, etc, and the light beams being brought 90° out of phase by a phase delay due to reflection of the beams on a half mirror or beam splitter.

According to the invention, there is provided an optical scale reader comprising a light source for radiating a beam of coherent light on a reflective scale, a half mirror for mixing light beams from the light source which are reflected and diffracted by the scale for interference with each other, an optical system for causing the intefering light beams leaving the half mirror on its opposite sides to be 90° out of phase with each other so that the light beams will fall on the half mirror at a particular angle of incidence, photodetectors for detecting the interfering light beams, respectively, which have left the half mirror, and a signal processor for processing first and second electric signals which are delivered from the photodetectors and 90° out of phase with each other and for generating a signal indicative of the distance which the scale has moved. The first and second signals comprise sinewave signals which are 90° out of phase with each other. The signal processor comprises square root means for producing a signal indicative of the square root of the sum of squares of the first and second signals at a time, into a digital signal with a signal from the square root means serving as a reference signal in the A/D converter, and a processing circuit for effecting a prescribed arithmetic operation on the signal from the A/D converter thereby to generate the signal indicative of the distance.

DETAILED DESCRIPTION OF PREFERRED EMBODIMENTS

Figure 2:
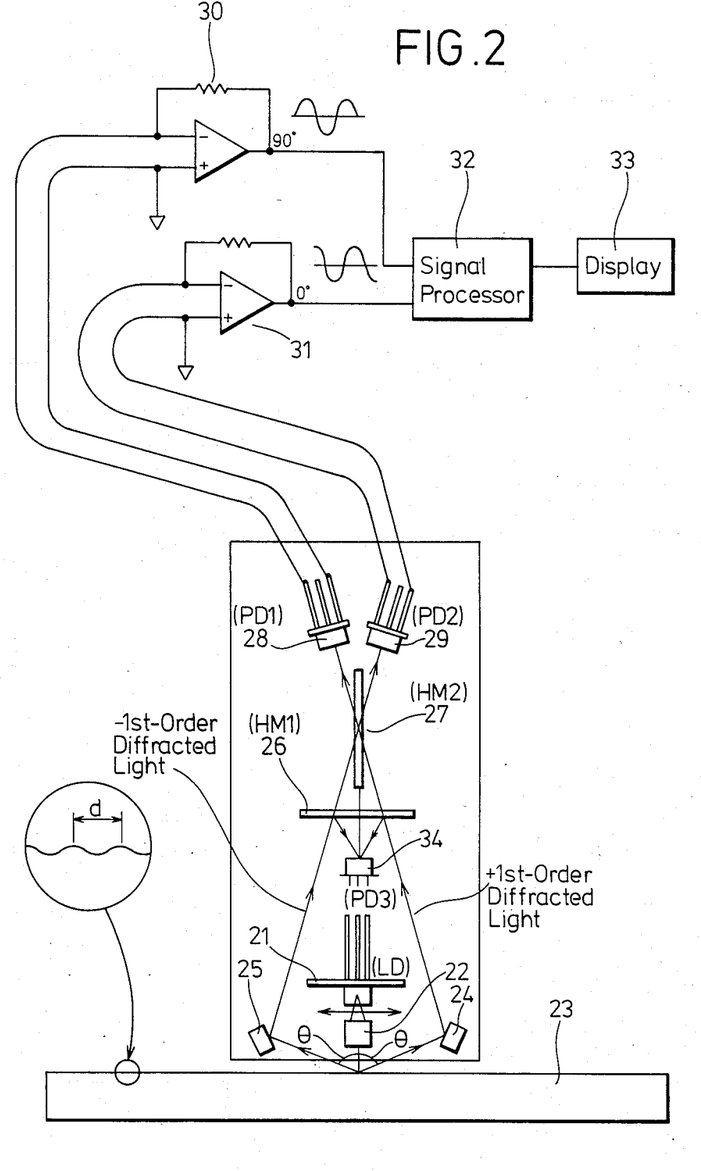
FIG. 2 is a schematic view depicting an illustrative embodiment of the invention.

Turning now to FIG. 2, there is depicted an illustrative optical scale reader comprising a light source 21, for example, comprising a semiconductor laser, for emitting a beam of coherent light; a condenser lens 22 for gathering the beam of light emitted by light source 21; a reflective scale 23 having a pitch d; a pair of mirrors 24,25 for reflecting diffracted light beams reflected by scale 23; a first half mirror or beam splitter 26 for dividing light beams reflected by mirrors 24,25; a second half mirror or beam splitter 27 for mixing light beams transmitted through first half mirror 26 and causing them to interfere with each other; a pair of photodetectors 28,29 for converting beams of diffracted light having different phases from second half mirror 27 into corresponding electric signals; and a photodetector 34 for detecting light beams reflected by first half mirror 26. The illustrative optical scale reader also comprises a pair of amplifiers 30,31 for amplifying the output electric signals generated by detectors 28,29, respectively; a signal processor 32 for processing, or effecting arithmetic operations on, output signals from amplifiers 30,31; and a display 33 for displaying output signal from signal processor 32.

Operation of the optical scale reader will now be described. A laser beam emitted by semiconductor laser 21 is controlled by lens 22 so as to fall on photodetectors 28,29 as rays of light extending at an angle or parallel to each other. The emitted laser beam has a plane of polarization as shown, and is radiated onto scale 23. Scale 23 comprises a diffraction grating having narrow grooves spaced at equal intervals or a diffraction grating used in holography.

The emitted laser beam is diffracted by scale 23 at a diffraction angle $\theta$ given by:

$$\sin \theta = m\lambda/d \text{ (m is an integer)}$$

wherein d is the groove to groove pitch of scale 23; and $\lambda$ is the wavelength of the laser beam emitted by laser 21; and wherein $$-90° \leq \theta \leq 90°; \text{ and } -1 \leq m\lambda/d \leq +1.$$

If $\lambda = 0.78$ μm, and d = 0.83 μm, then m = 0 and ±1, and $$\theta = 0° \text{ (0th order diffracted light at m=0)}$$

$$\theta = \pm 70.0° \text{ (±1st order diffracted light at m=±1)}$$

The ±1st order diffracted light beams are reflected by mirrors 24,25, respectively, pass through first half mirror 26, and then are mixed and caused to interfere with each other by second half mirror 27. The interfering light beams are converted into electric signals by photodetectors 28,29 respectively.

At this time, the light beams are required to be 90° out of phase with each other, and a process by which the light beams are brought 90° out of phase with each other will now be described, with reference to FIG. 3, which shows the manner in which light beams interfere with each other. The half mirror, such as 27 in FIG. 2, is made of a plate 51 of glass and a semitransparent layer 52 of metal deposited on one surface of glass plate 51. In general, the phase of a light beam reflected by a metal surface is delayed, and the phase of a light beam reflected by or transmitted through a glass surface is not delayed.

Figure 3:
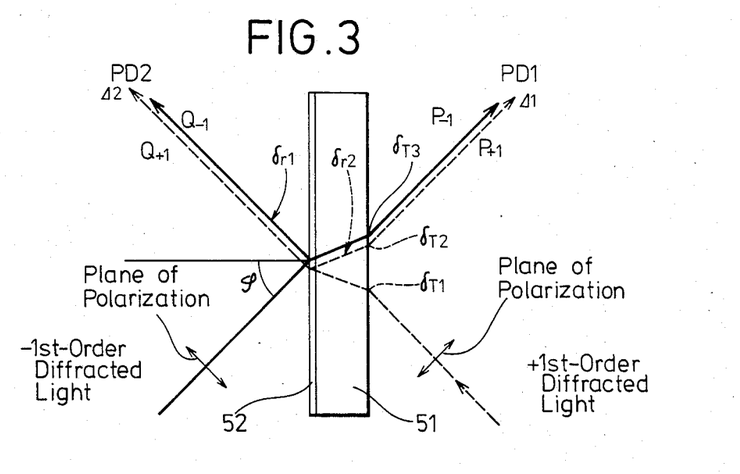
FIG. 3 depicts the phase relationship of light beams as they are subjected to interference, by a half mirror or beam splitter.

It is assumed in FIG. 3, that the phase delay of the −1st order diffracted ligher beam is indicated by $\delta_{r1}$; that the phase delay of the +1st order diffracted light beam is indicated by $\delta_{r2}$; that the phase delays of the light beams in glass plate 51 of the half mirror are indicated by $\delta_{t1}-\delta_{t3}$; that the +1st order diffracted light beams reflected by and transmitted through the half mirror and directed toward photodetectors 28,29 are indicated by $P_{+1}$, $Q_{+1}$, respectively; and that the −1st order diffracted light beams transmitted through and reflected by the half mirror and directed toward photodetectors 28,29 are indicated by $P_{-1}$, $Q_{-1}$, respectively.

These four light beams have the following phase delays:

$$P_{+1}, \delta_{t1} + \delta_{r2} + \delta_{t2}. \quad P_{-1}, \delta_{t3}$$
$$Q_{+1}, \delta_{t1} \quad\quad\quad\quad Q_{-1}, \delta_{r1}.$$

Therefore, phase difference $\Delta_1$ between light beams $P_{+1}$, $P_{-1}$ and the phase difference $\Delta_2$ between light beams $Q_{+1}$, $Q_{-1}$, are expressed by the following equations:

$$\Delta_1 = \delta_{t1} + \delta_{r2} + \delta_{t2} - \delta_{t3}.$$

$$\Delta_2 = \delta_{t1} - \delta_{r1}$$

If light beams $P_{+1}$, $P_{-1}$ travel along the same light path, then $\delta_{t2} = \delta_{t3}$, and hence the following equation is obtained:

$$\Delta_1 = \delta_{t1} + \delta_{r2}$$

The light beams $P_{+1}$, $P_{-1}$ and $Q_{+1}$, $Q_{-1}$ interfere with each other and fall on photodetectors 28,29 respectively. The phase difference $\alpha$ between output signals from photodetectors 28,29 is given by:

$$\alpha = \Delta_1 - \Delta_2$$
$$= \delta_{t1} + \delta_{r2} - \delta_{t1} - \delta_{r1}$$
$$= \delta_{r1} + \delta_{r2}$$

Therefore, the phase difference between the output signals from photodetectors 28,29 can be determined solely by $\delta_{r1}$ and $\delta_{r2}$, irrespectively of the thickness of the glass plate of the half mirror 27. The values of $\delta_{r1}$, $\delta_{r2}$ caused by the metal surface are determined by an angle of incidence and the angle of the planes of polarization of the incident light beams. The phase delays $\delta_{r1}$, $\delta_{r2}$ become maximum when the planes of polarization are oriented as shown in FIG. 3.

At this time, the following equations can be obtained according to the Fresnel's formula and the law of refraction:

$$Rp = \frac{\tan(\phi - x)}{\tan(\phi + x)} Ap$$

$$\sin x = \frac{\sin \phi}{n(1 + ik)}$$

wherein
Rp = complex amplitude of reflected light.
Ap = complex amplitude of incident light.
x = complex angle of refraction.
n = refractive index of the metal.
k = attenuation constant.
By eliminating x from the above equations, the phase delay of the reflected light beam can be expressed by:

$$\delta = \tan^{-1} \frac{Rp}{Ap}$$

$$= \tan^{-1}\left[\frac{2nk\tan\phi\sin\phi(\tan^2\phi + 1)}{\tan^2\phi(n^2 + (nk)^2) - \sin^2\phi(\tan^2\phi + 1)^2}\right]$$

The half mirror causes reflection both on the metal surface, and also on the glass surface. The reflection caused by the glass surface is inverted in phase by 180° at the Brewster's angle.

Figure 4:
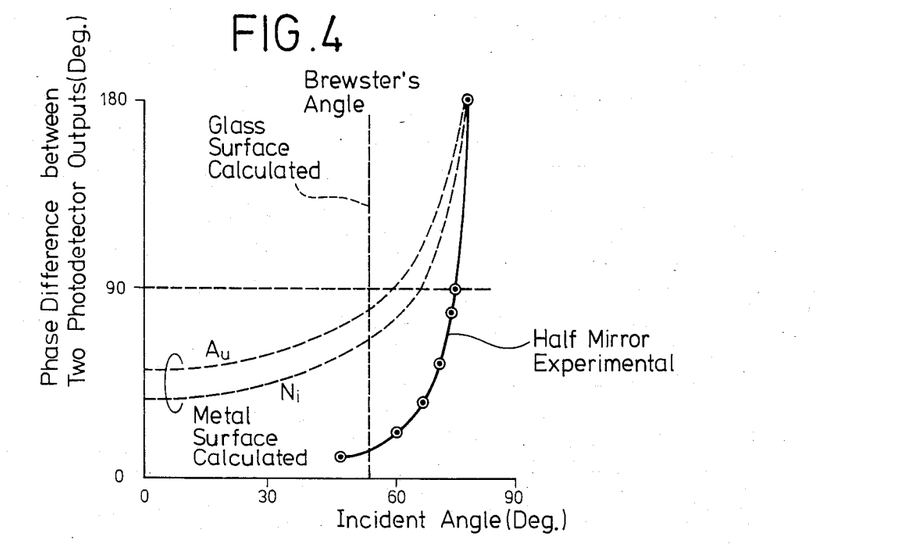
FIG. 4 is a diagram showing the relationship between incident angle and phase difference of the outputs from photodetectors.

The relationship as measured between the incident angle $\phi$ and the phase difference $\alpha$ between the outputs from the photodetectors 28,29 is plotted in FIG. 4. The half mirror with the illustrated relationship has the characteristics of both metal surface reflection and glass surface reflection.

Where an Inconel half mirror is employed, the phase difference $\alpha = 90°$, at an incident angle $\phi =$ about 75°. In FIG. 4, the abscissa indicates the incident angle $\phi$, and the ordinate indicates the phase difference $\alpha$ between the outputs from the photodetectors 28,29. Accordingly, the direction in which the scale moves can be determined by the outputs from the detectors 28,29, and the distance that the scale has moved can also be determined, by counting the number of sine waves generated.

Since the outputs from photodetectors 28,29 are sine waves that are exactly 90° out of phase with each other, they may be interpolated in an analog fashion to achieve high resolution, in the range of from 1/100 to 1/1000 $\mu$m, and can be displayed or used for positional control. The invention encompasses arrangements for processing signals having the phase difference of 90°. In such arrangements, the light beam falling on the scale has a diameter of from about 4 to 5 mm. Providing the pitch d of the scale is 0.8 $\mu$m, there are about 5,000 grating grooves in the light beam diameter, and all of the grating grooves form a single interference fringe. Therefore, any adverse affect due to grating defects on the scale, small pitch variations, or dirt or dust deposited on the scale, can be greatly reduced.

First half mirror 26 and photodetector 34 (see FIG. 2) are used for monitoring the optical power of the ±1st order light beams, and generates a voltage for removing biasing components of the sine wave outputs from photodetectors 28,29. The combination of the first half mirror 26 and photodetector 34 allows proper sine waves to be produced for conversion into accurate pulses even when the diffraction efficiency is varied from place to place on the scale and the intensities of the ±1st order light beams are varied due to dirt and dust, thereby changing the outputs from detectors 28,29. Such combination, however, need not be provided where the scale is uniform in property and subjected to only small positional and angular variations.

The inventive optical reader has the following advantages. The arrangement provides high resolution, ranging from 1/100 to to 1/1000 $\mu$m, for 100 mm or longer. It is simple in construction and operation. The operation utilizes phase delays caused when light beams are reflected by the half mirror and the invention eliminates any need for polarizers and ¼ wave plates. Moreover, since the light beam falling on the scale is large in diameter and no spatial filters and the like are provided on the detectors, any adverse affects of dirt, defects and pitch variations on the scale, are small at most. Furthermore, advantageously, allowable variations in the distance between the scale and the reader head may be large. Also, advantageously, the reflective scale can be mounted in place with relative ease.

Figure 5A:
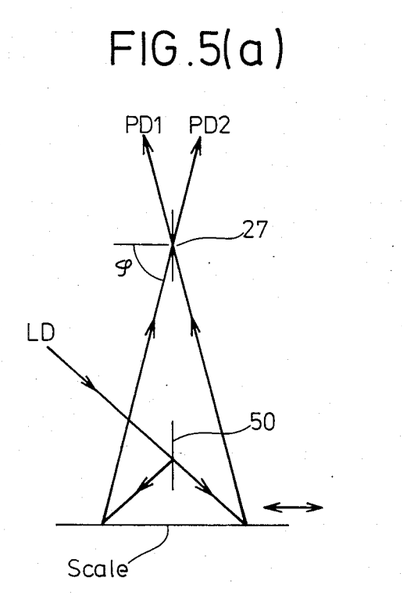
FIGS. 5(A) and 5(B) are schematic diagrams depicting optical scale readers according to other illustrative embodiments of the invention.
Figure 5B:
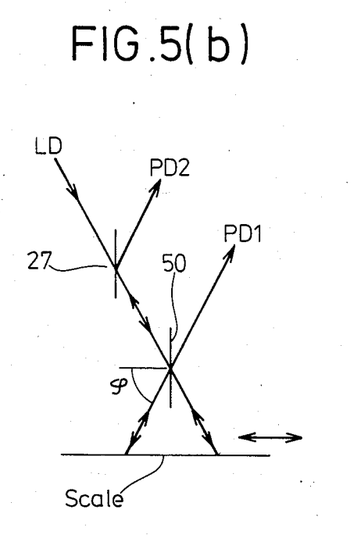

Turning now to FIGS. 5(A) and 5(B), there are depicted the light beams for apparatus of other illustrative embodiments of the invention. The physical components are omitted for convenience of description. It is to be understood, however, that the components of FIG. 2 can be similarly used. In addition, in each of the illustrated optical readers, a light beam emitted from a light source of coherent light obliquely with respect to the scale is divided by a third half mirror (labelled 50) into two light beams, so that two beams of light refracted on two points on the scale can be utilized. According to these embodiments, interference fringes generated can vary on rotation of the scale, so that small angles, through which the scale is angularly displaced, can be measured.

Figure 6:
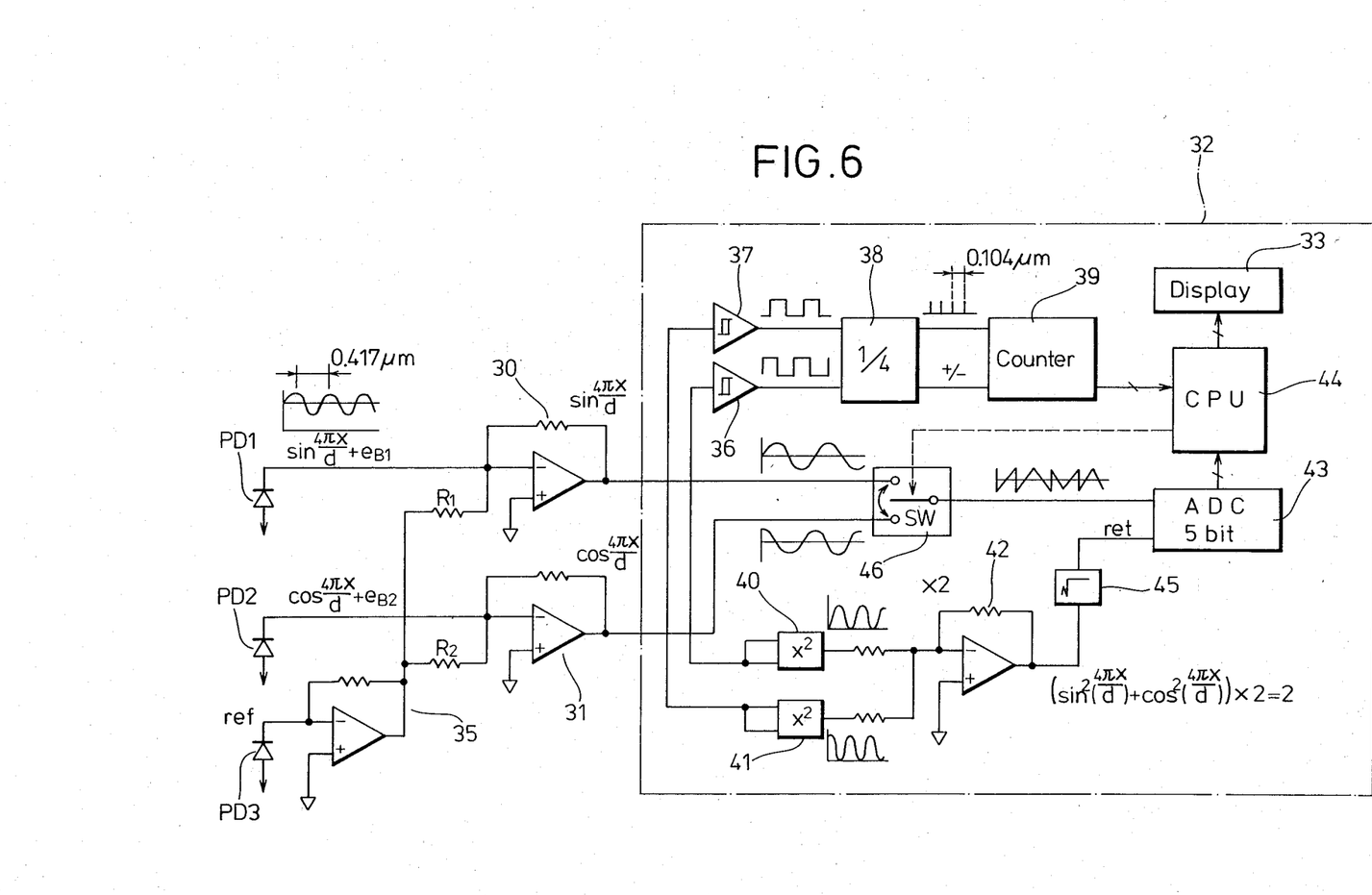
FIGS. 6 and 7 are block diagrams of components of the signal processor used in the embodiments.
Figures 7, 8:
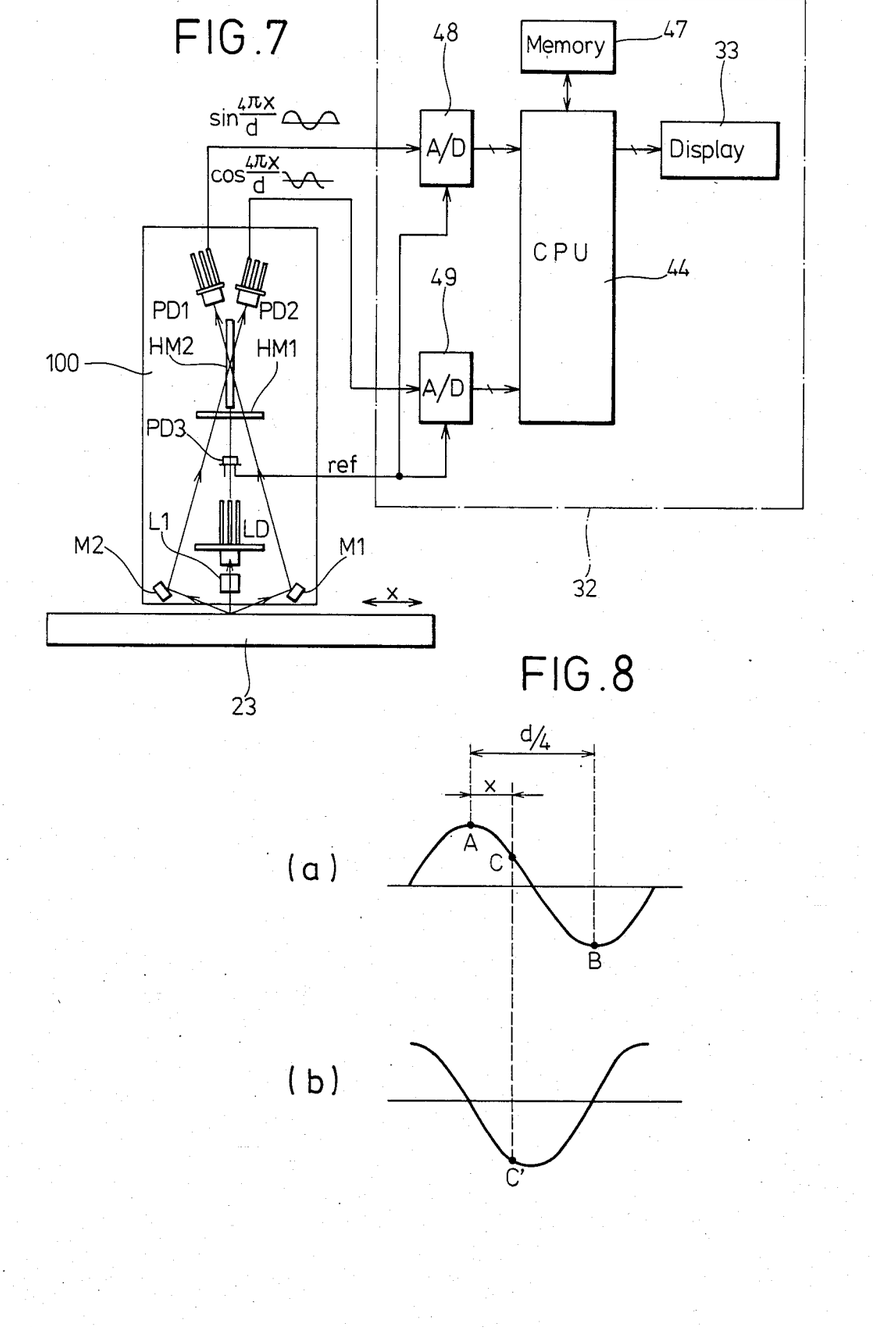
FIG. 8 depicts waveforms of signals in the arrangement of FIG. 7.

FIGS. 6 and 7 depict components of a signal processor, generally designated by number 32, which is used for processing output signals from the photodetectors 28,29,34, or PD1, PD2, PD3, as shown in FIG. 2.

As shown in FIG. 6, photodetectors PD1, PD2 and PD3 convert interference light beams of different phases into electrical signals. The output signal from photodetector PD3 is amplified by a first amplifier 35. The output signal from photodetector PD1 is amplified by second amplifier 30. The output signal from detector PD2 is amplified by third amplifier 31. An output signal from first amplifier 35 is applied to both second and third amplifiers 30,31. Signal processor 32 comprises a first comparator 36 for converting an output signal from second amplifier 30; a second comparator 37 for converting an output signal from third amplifier 31; a direction discriminator 38 for dividing the period of output signals from comparators 36,37 into ¼ and determining the direction of movement of scale 23; a counter 39 for counting the pulses of an output signal from direction discriminator 38; a first arithmetic unit 40 for squaring the sine wave output signal from second amplifier 30; and a second arithmetic unit 41 for squaring the sine wave output signal from third amplifier 31.

Signal processor 32 also comprises an adder 42 for generating a signal indicative of the sum of squared output signals from arithmetic units 40,41; a switch SW for selecting one at a time, of the output signals from amplifiers 30,31; a square root circuit 45 for providing a signal indicative of the square root of the output signal from adder 42; an A/D converter 43 having a reference voltage represented by the output signal from square root circuit 45 and an unknown input voltage represented by the sine wave signal transmitted through switch SW; a central processing unit 44 responsive to the count from counter 39 and an output signal from A/D converter 43, for controlling the changeover of switch SW, as a result of prescribed calculations; and a display unit 33 for displaying an output signal from central processing unit 44. Central processing unit 44 may comprise, for example, a micro-computer.

The signal processor operates as follows. The scale reader head (not shown) produces two signals which are 90° out of phase with each other, that is, a sine wave signal and a cosine wave signal, dependent on the distance x that the scale has moved. These signals are generated by detectors PD1, PD2 and contain DC biases, which will be cancelled out by the DC output signal from amplifier 35. When there is any difference between the biases in the output signals from photodetectors PD1, PD2, the difference is eliminated by adjusting the resistances of input resistors R1, R2, coupled to amplifiers 30,31, respectively.

The output signals generated by amplifiers 30,31 are converted by comparators 36,37 respectively, into pulses which are applied to direction discriminator 38. Direction discriminator 38 then produces a signal indicative of the direction of movement of the scale and pulses having a period which is ¼ of the applied pulses. The pulses from direction discriminator 38 are counted by counter 39. Since the output signals from detectors PD1,PD2 have a period which is ½ of the scale pitch, the resolution becomes ⅛ of the scale pitch. According to the illustrated circuit arrangement, the output pulses from counter 39 are interpolated by A/D converter 43 for achieving higher resolution.

The squared output signals from arithmetic units 40,41 are added and amplified by adder 42. The output signal from adder 42 is converted by square root circuit 45 into a reference voltage which will serve as a reference voltage in A/D converter 43.

The output signals, denoted respectively by $e_1$, $e_2$ from amplifiers 30,31 are given by:

$$e_1 = a \sin \frac{4\pi x}{d}$$

$$e_2 = a \cos \frac{4\pi x}{d}$$

where a is amplitude, d is scale pitch, and x is distance the scale has moved.

Therefore, the output signal from the square root circuit 45, or the reference voltage $e_r$ can be expressed as follows:

$$e_r = \sqrt{e_1^2 + e_2^2} = \sqrt{a^2\sin^2\frac{4\pi x}{d} + a^2\cos^2\frac{4\pi x}{d}} = a$$

The reference voltage in A/D converter 43 is thus equal to the amplitude regardless of the distance that the scale is moved, and can correctly divide the input voltage even when amplitude varies. Either the sine wave signal or the cosine wave signal, whichever has a better sensitivity, is selected by CPU 44 as the unknown input voltage applied to A/D converter 43. More specifically, CPU 44 supplies a switching signal to switch SW to enable it to select the signal of the better sensitivity and apply the selected signal to A/D converter 43. When the scale is moved at a high speed, counter 49 counts the output pulses from direction discriminator 38. When the scale is moving at a low speed or held at a rest, A/D converter 43 interpolates the output pulses from counter 39.

Accordingly, arithmetic units 40,41 and adder 42 may be of arrangements which operate at low speeds. After the scale has stopped moving, CPU 44, responsive to the output signals from counter 39 and A/D converter 43, effects prescribed arithmetic operations on the applied signals to determine the distance and direction of movement of the scale and also to enable display 33 to display the determined distance and direction.

The circuit of FIG. 6 has many advantages, such as, for example, since the counter counts the input pulses up to a resolution which is ⅛ of the scale pitch, the capacity and speed of operation of the counter remains constant no matter how the input signal is divided by the A/D converter. Thus, high speed response and high resolution can be achieved.

Also, advantageously, the sine wave signal or cosine wave signal, whichever is of higher sensitivity, can be selected by the switch and converted into a digital signal. Thus, even though the optical scale reader is of high resolution, the A/D converter may be of low resoltion. For example, it may be of 8 bits with resolution of 1/1000 μm.

Moreover, because the square root of $\sin^2 \theta + \cos^2 \theta$ is used as a reference voltage in the A/D converter, an accurate DC voltage is produced. High accuracy and high resolution can be achieved with a simple arrangement, even when the amplitudes of the sine wave and cosine wave signals vary.

Futhermore, advantageously, counting of the pulses by the counter and division of the input signal by the A/D converter, are performed independently of each other. Hence, no errors are accumulated at the time the A/D converter effects division.

While in the above embodiment, the switching signal is supplied by the CPU 44 to switch SW, the switch may be controlled by a logic circuit which may be separate from CPU 44.

Illustrated in FIG. 7 is another illustrative signal processor 32, comprising A/D converters 48,49 for converting sine wave and cosine wave signals from detectors PD1,PD2 into digital signals with a signal ref from detector PD3 serving as a reference signal; a central processing unit (CPU) 44, e.g. in the form of a micro-computer, for receiving digital signals from A/D converters 48, 49; a memory 47 coupled to CPU 44; and a display unit 34 coupled to CPU 44.

CPU 44 measures a phase difference between the sine and cosine waves (see FIG. 8, lines (a) and (b)) and counts the peak values (points A and B) while confirming the direction of movement of the scale. Then, it determines an amplitude based on the values at points A,B and calculates an interpolated value from a current value (point C) and determined amplitude. The, CPU 44 adds the values obtained in the foregoing steps, to calculate an actual distance, and displays the sum together with the direction of movement of the scale on display unit 33.

In the circuit arrangement shown in FIG. 7, an output signal from detector PD3, receptive of a light beam reflected by a first half mirror HM1, is used as a reference voltage in A/D converter 48,49. Thus, the optical scale reader will not be adversely affected when laser diode LD deteriorates, to the extent of varying output signals sin 4πx/d, cos 4πx/d from a reader head 100, since the visibility remains constant. Thus, CPU 44 is not required to calculate every variation in the amplitudes of the input signals.

The circuit of FIG. 7 is, advantageously, simple in construction, small in size, and lightweight, and furthermore, its signal processing can be readily implemented with use of software.

Figure 9:
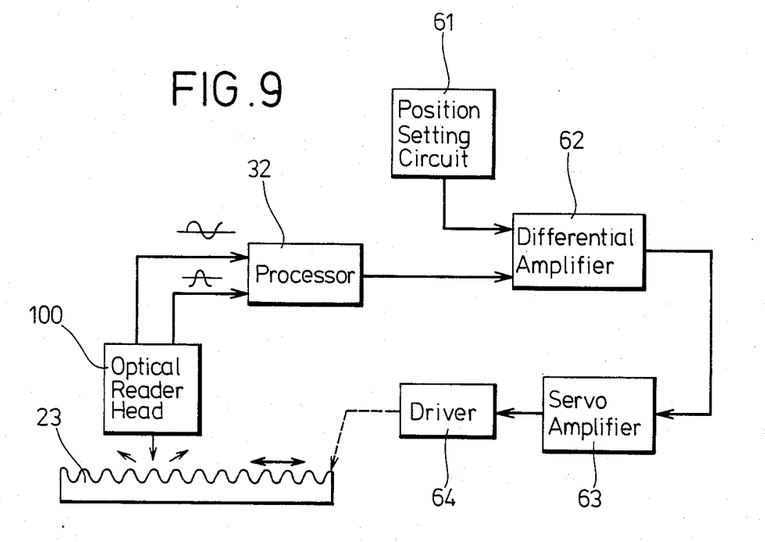
FIG. 9 is a block diagram depicting a position control device used together with the optical reader of the invention.

FIG. 9 depicts a position control apparatus for positional control, in the range of submicrons, with an optical scale reader of the invention being incorporated in the position control apparatus.

A reflective scale 23 is connected to a stage (not shown) of an VLSI manufacturing apparatus or an electron beam exposure apparatus or the like. The position control apparatus comprises a reader head 100 of an optical scale reader such as shown in FIG. 2, with the reader head 100 being disposed above scale 23, in confronting relation. Reader head 100 generates first and second signals indicative of the beams of coherent light which vary as the functions of cos θ and sin θ, as above discussed. A signal processor 32 calculates the distance and direction of movement of the scale on the basis of the first and second signals as above discussed.

The position control apparatus comprises a position setting circuit 61 for generating a signal indicative of a position setting for scale 23; a differential amplifier 62 for amplifying the difference between a signal indicative of the position of scale 23 and supplied by signal processor 32 and a position setting signal delivered from position setting signal 61; a servo amplifier 63 for delivering an output signal from differential amplifier 62 to a driver 64, which is responsive to the supplied signal for moving scale 23 in a direction to eliminate the difference between the position signal and the position setting signal.

Figure 10:
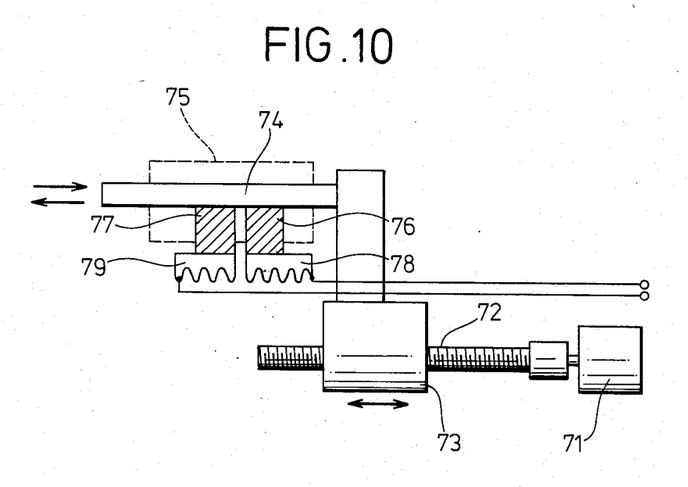
FIG. 10 is a front elevational view depicting a drive mechanism for the control device of FIG. 9.

FIG. 10 illustrates an exemplary driver 64 of FIG. 9, and comprises a servo motor 71 for rotating a screw 72 about its own axis selectively in one direction or the other and a ball bearing 73 threaded over screw 72. Screw 72 and ball bearing 73 jointly constitute a feed mechanism having resolution on the order of microns. An elongated driving body 74 extends parallel to screw 72 and has one end attached to ball bearing 73. Driving body 74 is expandable and contractable longitudinally as the ambient temperature changes. To driving body 74 is attached a Peltier effect device housed in a heat insulating casing 75 and composed of a P-type semiconductor 76, an N-type semiconductor 77, and heat radiators 78,79 mounted on semiconductors 76,77, respectively, for heating or cooling driving body 74, dependent on the polarity of a current flowing through semiconductors 76,77. The other end of driving body 74 is attached to scale 23.

Operation of the position control apparatus shown in FIGS. 9 and 10, is as follows. Driver 64 is responsive to output signal from servoamplifier 63 for moving scale 23 in a direction to eliminate the output signal from differential amplifier 62. For moving scale 23, it is first roughly adjusted by feed mechanism up to a range which is then adjustable by the Peltier effect device, Then, the Peltier effect device is activated for fine adjustment of scale 23. On the assumption that the coefficient of thermal expansion of driving body 74 is 10 ppm/°C. and the entire length thereof is 10 mm, positional control with a resolution of 0.1 $\mu$m/°C. can be achieved.

With the foregoing arrangement of FIGS. 9 and 10, the position control apparatus can control the position of the scale with very high resolution, is small in size, is relatively simple in construction, can be controlled and adjusted with ease, and operates stably even when subjected to variations in ambient conditions, such as atmospheric pressure, humidity and the like.

While in the disclosed embodiment the driving body is expanded or contracted by being heated or cooled by the Peltier effect device, the driving body may be expanded or contracted by a heater and a cooler, or a piezoelectric device, or the like.

Instead of moving the scale with the driver, the reader head may be moved with respect to the scale. If necessary, the output signals from the signal processor may be displayed as the distance and direction of movement of the scale on a display unit.

Two such position control devices may be used together and disposed perpendicularly in X and Y directions for effecting two dimensional position control. Three more more such control devices can also be used to effect three or more dimensionals position control, such as X,Y and Z, etc.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An optical scale reader comprising
   a light source for radiating a beam of coherent light on a reflective scale to produce at least two light beams which are diffracted and reflected by said scale;
   a half mirror for mixing the at least two defracted and reflected light beams for interference with each other;
   an optical system for causing said at least two diffracted and reflected light beams to impinge on said half mirror at particular angles of incidence so that a first interfering light beam leaving said half mirror on one side thereof is caused to be 90° out of phase with a second interfering light beam leaving the other side of said half mirror;
   a first photodetector for detecting said first interfering light beam leaving said half mirror and for producing a first electric signal in response thereto;
   a second photodetector for detecting said second interfering light beam leaving said half mirror and for producing a second electrical signal in response thereto; and
   signal processor means for processing said first and second electrical signals to generate a signal indicative of a distance moved by said scale.

2. The reader of claim 1, wherein said half mirror comprises an Inconel thin film, and wherein said angles of incidence of said at least two diffracted reflected light beams on said half mirror is 75°.

3. The reader of claim 1, wherein said light source comprises a half mirror for dividing said beam of coherent light into two light beams and for radiating said two light beams on said reflective scale.

4. The reader of claim 1, wherein said first and second electrical signals comprise sine wave signals which are 90° out of phase with each other; and wherein said signal processor means comprises means for producing a reference signal and for producing a signal indicative of the square root of the sum of squares of said first and second electrical signals, and A/D converter for converting one of said first and second electrical signals at a time into a digital signal based on said reference signal, and a processing circuit for effecting a prescribed arithmetic operation on said digital signal from said A/D converter to generate said signal indicative of said distance.

5. The reader of claim 4, where said signal processor means further comprises comparators for converting said sine wave signals into pulses when said sine wave signals are repetitive signals, a direction discriminator for discriminating a direction of movement of said scale based on phase difference of 90° between said two sine wave signals, and a counter for counting output pulses from said direction discriminator, said processing circuit being arranged to effect an arithmetic operation on a count from said counter and said digital signal from said A/D converter to calculate said distance.

6. The reader of claim 1, wherein said signal processor means comprises a third photodetector for detecting a third diffracted reflected light beam from said scale and for producing a second reference signal, and wherein said signal processor means comprises an A/D converter for converting said first and second electrical signals into digital signals, and wherein said second reference signal is applied to said A/D converter.

7. A position control apparatus comprising
a reflective scale;
an optical reader comprising a light source for radiating a beam of coherent light on said scale to produce at least two diffracted reflected light beams, a half mirror, a first mirror and a second mirror for respectively reflecting said at least two diffracted reflected light beams onto opposite sides of said half mirror at certain angles of incidence to cause interference therebetween and thereby produce first and second interfering output light beams, respectively, from opposite sides of said half mirror which are 90° out of phase with each other, and first and second photodetectors for respectively converting said first and second interfering output light beams into respective first and second electrical signals;
a signal processor for calculating distance and direction of movement of said scale relative to said head based on said first and second electrical signals and for generating a third electrical signal indicative of the actual position of said scale relative to said head;
a position setting circuit for generating a fourth electrical signal indicative of a desired position setting position for said scale relative to said head;
a differential amplifier for generating and amplifying a fifth electrical signal indicative of the difference between said third electrical signal and said fourth electrical signal;
a servoamplifier for amplifying said fifth electrical signal generated by said differential amplifier; and
a driver means for moving said scale relative to said head in a direction to eliminate said difference between the actual position of said scale relative to said head and the desired position setting position, in response to said servoamplifier.

8. The apparatus of claim 7 wherein said driver means includes a driving body coupled to said scale and a Peltier effect device coupled to said driving body, said Peltier effect device causing expansion and contraction of said driving body.

9. The apparatus of claim 7, wherein said driver means comprises a piezoelectric device.

* * * * *